(12) United States Patent
Lee

(10) Patent No.: US 7,426,912 B2
(45) Date of Patent: Sep. 23, 2008

(54) OIL SUPPLY CIRCUIT FOR CYLINDER DEACTIVATION SYSTEM

(75) Inventor: Bong Sang Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/657,319

(22) Filed: Jan. 24, 2007

(65) Prior Publication Data
US 2008/0135003 A1    Jun. 12, 2008

(30) Foreign Application Priority Data
Dec. 7, 2006    (KR) ...................... 10-2006-0124072

(51) Int. Cl.
*F01L 9/02* (2006.01)
(52) U.S. Cl. .............. 123/90.12; 123/90.13; 123/90.31; 123/90.48
(58) Field of Classification Search .............. 123/90.12, 123/90.13, 90.15, 90.16, 90.18, 90.17, 90.27, 123/90.31, 90.48, 90.52
See application file for complete search history.

(56) References Cited

U.S. PATENT DOCUMENTS 4,794,893 A * 1/1989 Masuda et al. ........... 123/90.17
5,645,022 A * 7/1997 Yamamoto et al. ....... 123/90.17

* cited by examiner

*Primary Examiner*—Ching Chang
(74) *Attorney, Agent, or Firm*—Morgan Lewis & Bockius LLP

(57) ABSTRACT

An oil supply circuit for a cylinder deactivation system having a simple structure and capable of being installed at a cylinder head without needing additional extraneous elements by forming an oil line within a cam shaft. An embodiment may include a hydraulic pump, a plurality of tappets for controlling opening of intake and exhaust valves, a first oil circuit connected to the hydraulic pump through an oil supply line and supplying a high pressure oil to the tappets, and a second oil circuit connected to the hydraulic pump and supplying an oil to the tappets. The second oil circuit includes an oil line formed in a hollow space of the cam shaft.

4 Claims, 4 Drawing Sheets

US 7,426,912 B2

OIL SUPPLY CIRCUIT FOR CYLINDER DEACTIVATION SYSTEM

CROSS-REFERENCE TO RELATED APPLICATION

This application claims priority to and the benefit of Korean Patent Application No. 10-2006-0124072 filed in the Korean Intellectual Property Office on Dec. 7, 2006, the entire contents of which are incorporated herein by reference.

BACKGROUND OF THE INVENTION (a) Field of the Invention

The present invention relates to an oil supply circuit for a cylinder deactivation system. More particularly, the present invention relates to an oil supply circuit for a cylinder deactivation system having a simple structure and capable of being installed at a cylinder head without needing additional extraneous elements by forming an oil line in a cam shaft of a hollow space.

(b) Description of the Related Art

A cylinder deactivation system is a system that stops unnecessary cylinders according to a driving condition. The cylinder deactivation system can improve fuel consumption by stopping the unnecessary cylinders.

According to the cylinder deactivation system, operations of intake and exhaust cams are controlled by supplying high pressure oil or low pressure oil to tappets that control openings of intake and exhaust valves according to driving conditions. That is, the cams rotate but the valves do not operate when the high pressure oil is supplied to the tappets. On the other hand, the cams rotate and the valves also operate when the low pressure oil is supplied to the tappets.

According to a conventional cylinder deactivation system, an oil supply circuit for supplying the high pressure oil and the low pressure oil to the tappets may be complex and may need additional extraneous elements so as to install the oil supply circuit at a cylinder head.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide an oil supply circuit for a cylinder deactivation system having advantages of simplifying a structure thereof by forming an oil line in a cam shaft that is always installed at a cylinder head.

An oil supply circuit for a cylinder deactivation system according to an exemplary embodiment of the present invention may include: a hydraulic pump; a plurality of tappets for controlling opening of intake and exhaust valves; a first oil circuit connected to the hydraulic pump through an oil supply line and supplying a high pressure oil to the tappets; and a second oil circuit connected to the hydraulic pump and supplying oil to the tappets, wherein the second oil circuit includes an oil line formed in a hollow space of a cam shaft.

The first oil circuit may include: a first high pressure supply circuit for supplying the high pressure oil to the tappets of first and second cylinders; and a second high pressure supply circuit for supplying the high pressure oil to the tappets of third and fourth cylinders.

The first high pressure supply circuit may be connected to the second high pressure supply circuit through an oil bifurcation line bifurcated from the oil supply line.

The first high pressure supply circuit may include: a first control valve connected to the oil supply line and controlling an oil supply; a first exhaust-side oil supply line connected to the first control valve and supplying an oil to the exhaust-side tappets of the first and second cylinders; and a first intake-side oil supply line connected to the first control valve and supplying the intake-side tappets of the first and second cylinders.

The second high pressure supply circuit may include: a second control valve connected to the oil bifurcation line and controlling the oil supply; a second exhaust-side oil supply line connected to the second control valve and supplying the exhaust-side tappets of the third and fourth cylinders; and a second intake-side oil supply line connected to the second control valve and supplying the intake-side tappets of the third and fourth cylinders.

The oil supplied to the tappets from the first oil circuit may be supplied to the oil line through an orifice.

DETAILED DESCRIPTION OF THE EMBODIMENT

An exemplary embodiment of the present invention will hereinafter be described in detail with reference to the accompanying drawings.

Figure 1:
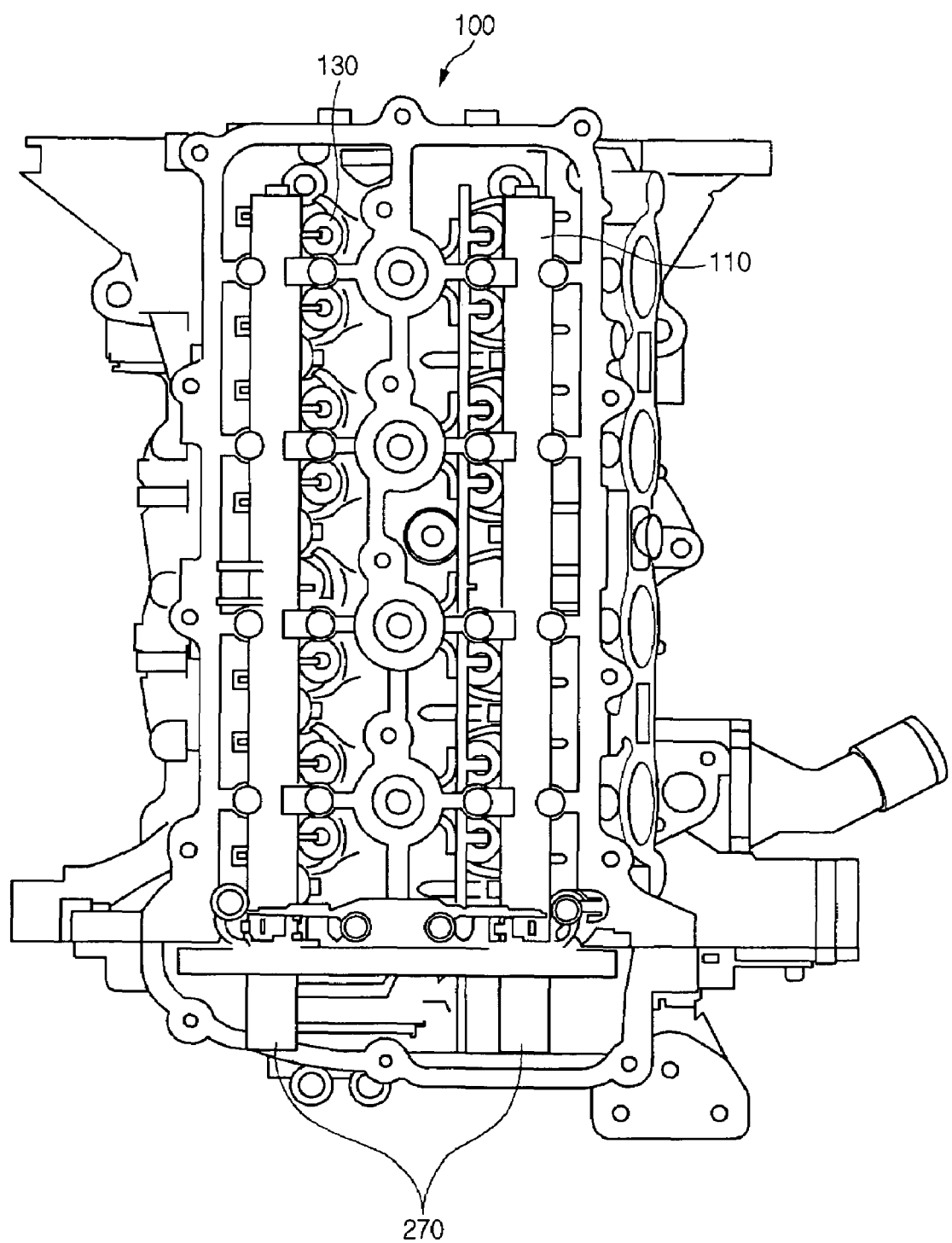
FIG. 1 is a top plan view showing that an oil supply circuit for a cylinder deactivation system is installed at a cylinder head according to an exemplary embodiment of the present invention.

As shown in FIG. 1, an oil supply circuit for a cylinder deactivation system according to an exemplary embodiment of the present invention is installed at a cylinder head 100. Cam shafts 110 and a plurality of tappets 130 are mounted at an upper surface of the cylinder head 100. The cam shafts 110 rotate and control movement of the tappets 130. The tappets 130 reciprocate vertically and control openings of intake and exhaust valves (not shown).

Figure 2:
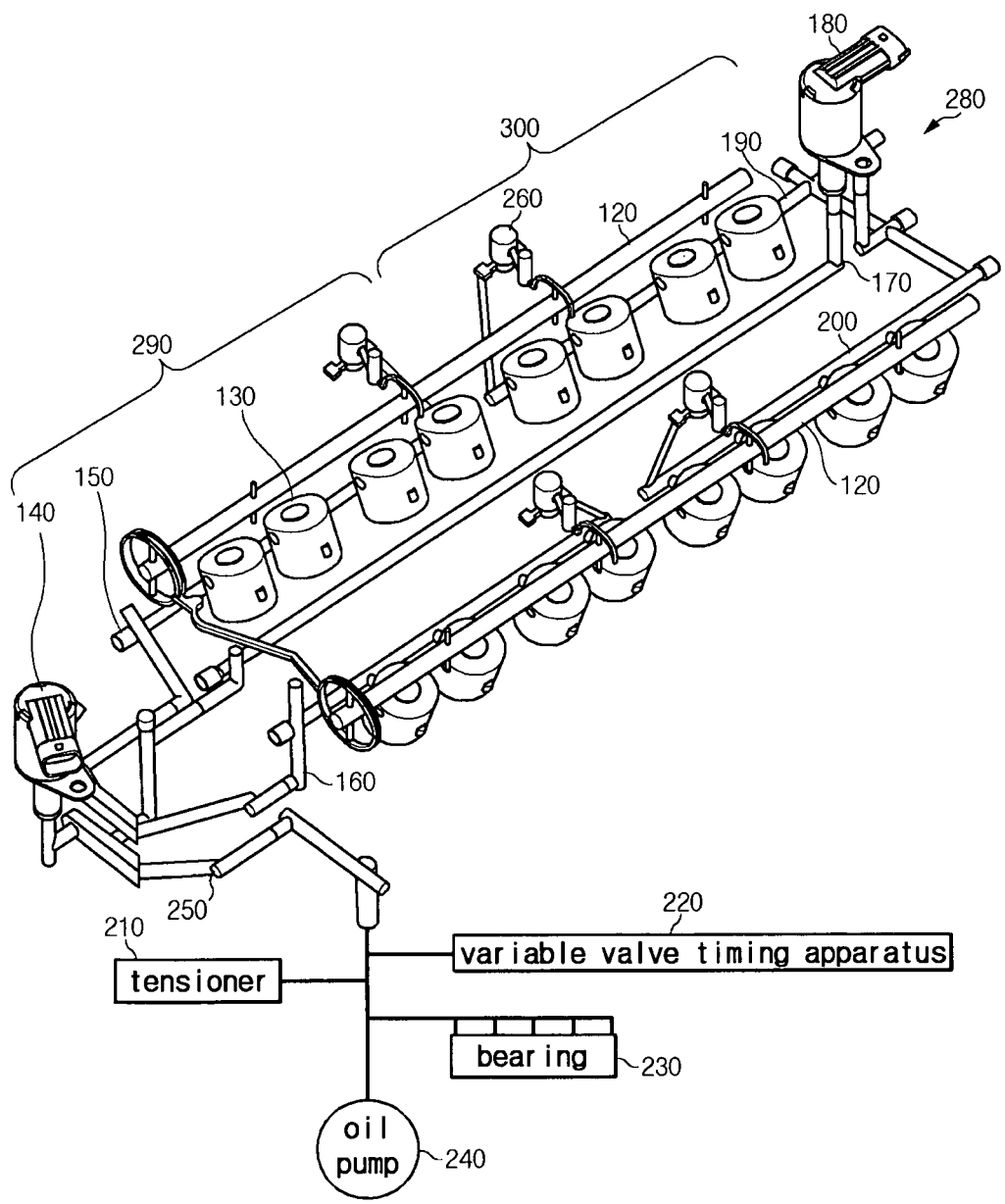
FIG. 2 is a schematic diagram of an oil supply circuit for a cylinder deactivation system according to an exemplary embodiment of the present invention.

As shown in FIG. 2, the oil supply circuit for a cylinder deactivation system according to an exemplary embodiment of the present invention includes a hydraulic pump 240, a plurality of tappets 130, a first oil circuit 280, and a second oil circuit 270 (shown in FIG. 1).

The hydraulic pump 240 supplies oil to the tappets 130 through the first oil circuit 280 and the second oil circuit 270. The hydraulic pump 240 is connected to the first oil circuit 280 through an oil supply line 250. In addition, the hydraulic pump 240 supplies the oil to a tensioner 210, a variable valve timing apparatus 220, and a bearing 230 through the oil supply line 250. The tappets 130 receive the oil from the hydraulic pump 240 and control the openings of the intake and exhaust valves.

The first oil circuit 280 is connected to the hydraulic pump 240 through the oil supply line 250. The first oil circuit 280 supplies high pressure oil to the tappets 130. The first oil circuit 280 includes a first high pressure supply circuit 290 for supplying the high pressure oil to the tappets 130 of first and second cylinders and a second high pressure supply circuit 300 for supplying the high pressure oil to the tappets 130 of third and fourth cylinders.

Figure 3:
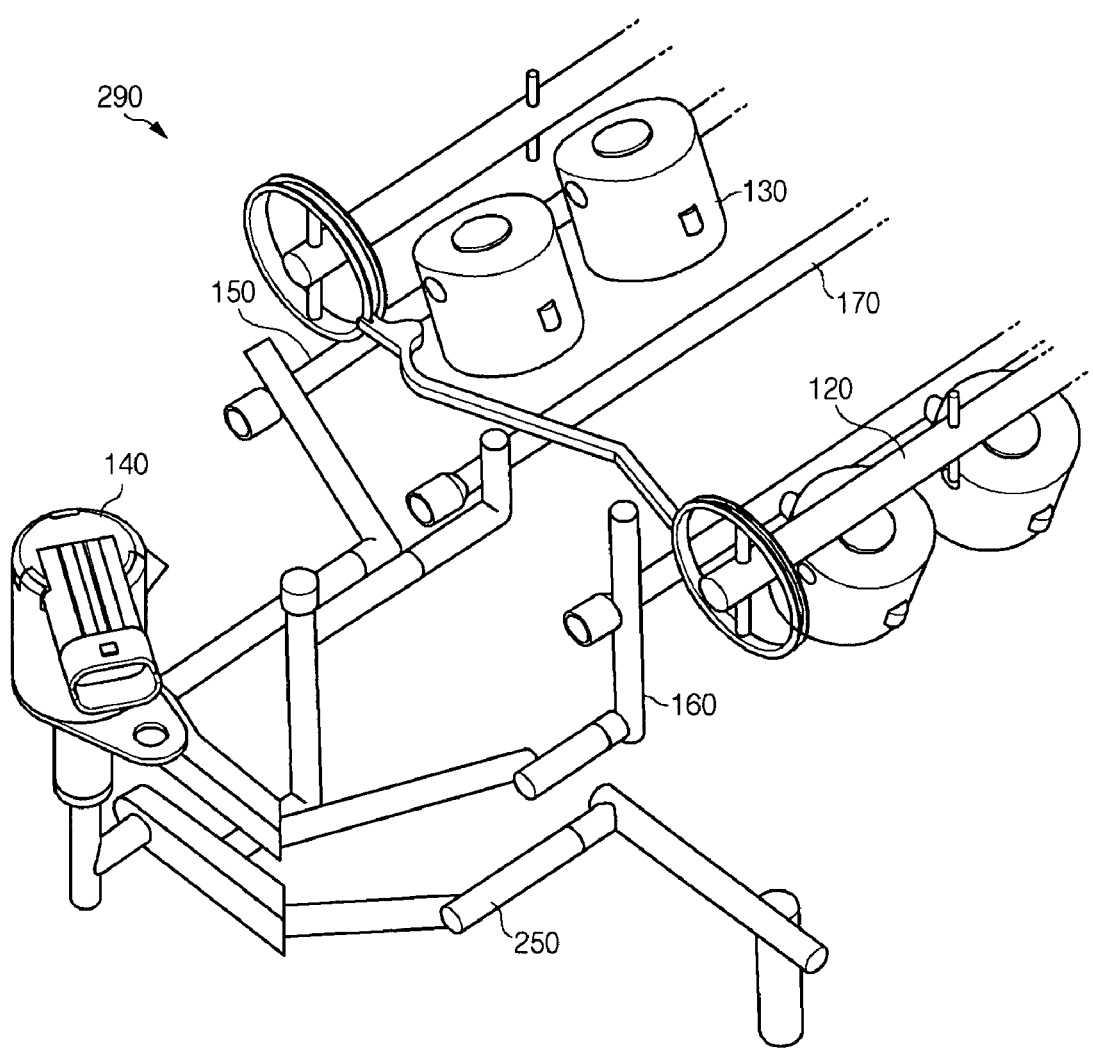
FIG. 3 is an enlarged view of a first high pressure supply circuit of FIG. 2.

In addition, the first high pressure supply circuit 290 is connected to the second high pressure supply circuit 300 through an oil bifurcation line 170 bifurcated from the oil supply line 250. The first high pressure supply circuit 290, as shown in FIG. 2 and FIG. 3, includes a first control valve 140, a first exhaust-side oil supply line 150, and a first intake-side oil supply line 160.

The first control valve 140 is connected to the oil supply line 250 and receives the high pressure oil from the oil supply line 250. The first control valve 140 controls the oil supply to the exhaust-side and intake-side tappets 130 of the first and second cylinders according to a control signal of an engine control unit (not shown).

The first exhaust-side oil supply line 150 is connected to the first control valve 140 and receives the oil. In addition, the first exhaust-side oil supply line 150 supplies the oil to the exhaust-side tappets 130 of the first and second cylinders.

The first intake-side oil supply line 160 is connected to the first control valve 140 and receives the oil. In addition, the first intake-side oil supply line 160 supplies the oil to the intake-side tappets 130 of the first and second cylinders.

Figure 4:
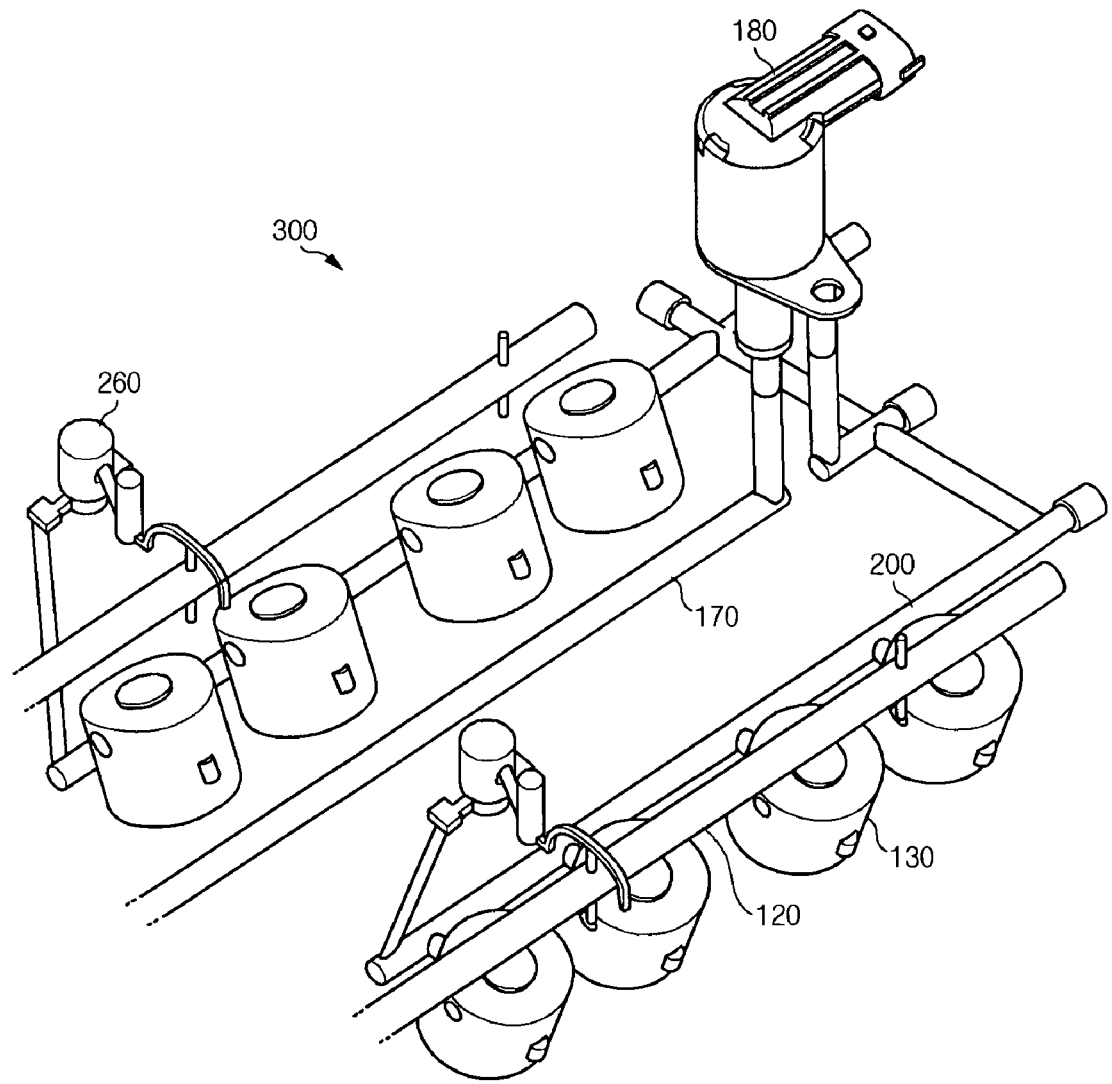
FIG. 4 is an enlarged view of a second high pressure supply circuit of FIG. 2.

The second high pressure supply circuit 300, as shown in FIG. 2 and FIG. 4, includes a second control valve 180, a second exhaust-side oil supply line 190, and a second intake-side oil supply line 200.

The second control valve 180 is connected to the oil bifurcation line 170 bifurcated from the oil supply line 250 and receives the oil. The second control valve 180 controls the oil supply to the exhaust-side and intake-side tappets 130 of the third and fourth cylinders according to the control signal of the engine control unit (not shown).

The second exhaust-side oil supply line 190 is connected to the second control valve 180 and receives the oil. In addition, the second exhaust-side oil supply line 190 supplies the oil to the exhaust-side tappets 130 of the third and fourth cylinders.

The second intake-side oil supply line 200 is connected to the second control valve 180 and receives the oil. In addition, the second intake-side oil supply line 200 supplies the oil to the intake-side tappets 130 of the third and fourth cylinders.

The second oil circuit 270 is connected to the hydraulic pump 240 and supplies the oil received from the hydraulic pump 240 to the tappets 130. The second oil circuit 270 includes an oil line 120 formed in a hollow space of the cam shafts 110. The oil line 120 supplies the oil to the tappets 130 through orifices 260.

In addition, the high pressure oil supplied to the tappets 130 from the first oil circuit 280 may be supplied to the oil line 120 after the pressure of the oil is lowered when the oil flows through the orifices 260.

According to the present invention, an oil line is formed in a cam shaft that is always installed at a cylinder head, and accordingly, a structure of an oil supply circuit may be simple. In addition, since the oil line is formed in the cam shaft, the oil supply circuit may be installed at a cylinder head without needing additional extraneous elements.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An oil supply circuit for a cylinder deactivation system, comprising:
   a hydraulic pump;
   a plurality of tappets for controlling opening of intake and exhaust valves;
   a first oil circuit connected to the hydraulic pump through an oil supply line and supplying a high pressure oil to the tappets, wherein the first oil circuit comprises a first high pressure supply circuit for supplying the high pressure oil to the tappets of first and second cylinders, and a second high pressure supply circuit for supplying the high pressure oil to the tappets of third and fourth cylinders, wherein the first high pressure supply circuit is connected to the second high pressure supply circuit through an oil bifurcation line bifurcated from the oil supply line; and
   a second oil circuit connected to the hydraulic pump and supplying oil to the tappets, wherein the second oil circuit comprises an oil line formed in a hollow space of a cam shaft;
   wherein the first high pressure supply circuit comprises:
     a first control valve connected to the oil supply line and controlling an oil supply;
     a first exhaust-side oil supply line connected to the first control valve and supplying an oil to the exhaust-side tappets of the first and second cylinders; and
     a first intake-side oil supply line connected to the first control valve and supplying the oil to the intake-side tappets of the first and second cylinders.

2. The oil supply circuit of claim 1, wherein the oil supplied to the tappets from the first oil circuit is supplied to the oil line through an orifice.

3. An oil supply circuit for a cylinder deactivation system, comprising:
   a hydraulic pump;
   a plurality of tappets for controlling opening of intake and exhaust valves;
   a first oil circuit connected to the hydraulic pump through an oil supply line and supplying a high pressure oil to the tappets, wherein the first oil circuit comprises a first high pressure supply circuit for supplying the high pressure oil to the tappets of first and second cylinders, and a second high pressure supply circuit for supplying the high pressure oil to the tappets of third and fourth cylinders, wherein the first high pressure supply circuit is connected to the second high pressure supply circuit through an oil bifurcation line bifurcated from the oil supply line; and
   a second oil circuit connected to the hydraulic pump and supplying oil to the tappets, wherein the second oil circuit comprises an oil line formed in a hollow space of a cam shaft;
   wherein the second high pressure supply circuit comprises:
     a second control valve connected to the oil bifurcation line and controlling the oil supply;
     a second exhaust-side oil supply line connected to the second control valve and supplying an oil to the exhaust-side tappets of the third and fourth cylinders; and
     a second intake-side oil supply line connected to the second control valve and supplying the oil to the intake-side tappets of the third and fourth cylinders.

4. The oil supply circuit of claim 3, wherein the oil supplied to the tappets from the first oil circuit is supplied to the oil line through an orifice.

* * * * *